(12) United States Patent
Yamamura et al.

(10) Patent No.: US 10,500,918 B2
(45) Date of Patent: Dec. 10, 2019

(54) VEHICLE AIR-CONDITIONING APPARATUS, AND VEHICLE INCLUDING SAME

(71) Applicant: Mitsubishi Electric Corporation, Chiyoda-ku, Tokyo (JP)

(72) Inventors: Akinori Yamamura, Tokyo (JP); Masatoshi Urakawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 119 days.

(21) Appl. No.: 15/503,803

(22) PCT Filed: May 1, 2015

(86) PCT No.: PCT/JP2015/063109
§ 371 (c)(1),
(2) Date: Feb. 14, 2017

(87) PCT Pub. No.: WO2016/038930
PCT Pub. Date: Mar. 17, 2016

(65) Prior Publication Data
US 2017/0232814 A1     Aug. 17, 2017

(30) Foreign Application Priority Data

Sep. 11, 2014 (JP) ................................. 2014-185099

(51) Int. Cl.
  *B60H 1/00*  (2006.01)
  *B60H 1/32*  (2006.01)
  *B61D 27/00*  (2006.01)

(52) U.S. Cl.
  CPC ..... *B60H 1/00028* (2013.01); *B60H 1/00428* (2013.01); *B60H 1/3204* (2013.01);
  (Continued)

(58) Field of Classification Search
  CPC ............ B60H 1/00028; B60H 1/00371; B60H 1/00428; B60H 1/00521; B60H 1/3204;
  (Continued)

(56) References Cited

U.S. PATENT DOCUMENTS 2,780,077 A * 2/1957 Jacobs ............... B60H 1/00007
                                                        165/43
5,473,912 A * 12/1995 Stork ........................ B60P 3/36
                                                        62/239

(Continued)

FOREIGN PATENT DOCUMENTS

DE          632663 C1      7/1936
EP       2 716 480 A1      4/2014
(Continued)

OTHER PUBLICATIONS

Extended European Search Report dated Mar. 8, 2018, issued by the European Patent Office in corresponding European Application No. 15839360.3. (8 pages).

(Continued)

*Primary Examiner* — Joseph F Trpisovsky
(74) *Attorney, Agent, or Firm* — Buchanan Ingersoll & Rooney PC (57) ABSTRACT

A vehicle air-conditioning apparatus that exhibits improved energy saving performance is provided. In addition, a vehicle with such a vehicle air-conditioning apparatus is provided. The vehicle air-conditioning apparatus includes a cooler provided in a first air passage, and a first air-sending device including a motor and a fan provided in the first air passage, and configured to drive the fan with the motor to thereby generate an airflow that flows into a vehicle interior through the first air passage. At least a part of an outer surface of the motor is located outside the first air passage.

13 Claims, 3 Drawing Sheets

(52) U.S. Cl.
CPC .................... *B61D 27/0018* (2013.01); *B60H 2001/00099* (2013.01); *B60H 2001/00135* (2013.01); *B60H 2001/00614* (2013.01)

(58) Field of Classification Search
CPC ...... B60H 1/00564; B60H 2001/00099; B60H 2001/00135; B60H 2001/00614; B61D 27/0018; Y02T 10/88; Y02T 30/42
USPC .................................................. 62/419, 239
See application file for complete search history.

(56) References Cited

U.S. PATENT DOCUMENTS

| | | | |
|---|---|---|---|
| 6,276,165 | B1 | 8/2001 | Nishijima et al. |
| 6,505,807 | B1 * | 1/2003 | Nolting .............. B60H 1/00521 248/638 |

FOREIGN PATENT DOCUMENTS

| | | |
|---|---|---|
| EP | 2 054 250 B1 | 3/2016 |
| JP | 63-3219 B2 | 1/1988 |
| JP | 5-26933 Y2 | 7/1993 |
| JP | 8-127221 A | 5/1996 |
| JP | 9-216510 A | 8/1997 |
| JP | 2000-304378 A | 11/2000 |
| JP | 2001-342998 A | 12/2001 |
| JP | 2004-217024 A | 8/2004 |
| JP | 2005-20923 A | 1/2005 |
| JP | 2008-155827 A | 7/2008 |
| WO | 01/54252 A1 | 7/2001 |
| WO | WO 2013/098879 A1 | 7/2013 |

OTHER PUBLICATIONS

International Search Report (PCT/ISA/210) dated Aug. 4, 2015, by the Japanese Patent Office as the International Searching Authority for International Application No. PCT/JP2015/063109.

Written Opinion (PCT/ISA/237) dated Aug. 4, 2015, by the Japanese Patent Office as the International Searching Authority for International Application No. PCT/JP2015/063109.

Office Action (Notice of Reasons for Rejection) dated Jul. 4, 2017, by the Japanese Patent Office in corresponding Japanese Patent Application No. 2016-547715 and English translation of the Office Action. (8 pages).

Office Action dated Aug. 23, 2018, by the Chinese Patent Office in corresponding Chinese Patent Application No. 201580047173.1 and English translation of the Office Action. (15 pages).

Office Action dated Nov. 21, 2018 in corresponding European Patent Application No. 15 839 360.3.

* cited by examiner

VEHICLE AIR-CONDITIONING APPARATUS, AND VEHICLE INCLUDING SAME

TECHNICAL FIELD

The present invention relates to a vehicle air-conditioning apparatus, and a vehicle including the vehicle air-conditioning apparatus.

BACKGROUND ART

Conventional vehicle air-conditioning apparatuses generally include a refrigerant circuit in which a compressor, a heat source-side heat exchanger, an expansion device, and a load-side heat exchanger are connected via a pipe, and a fan that generates an airflow in an air passage where the load-side heat exchanger is located, so as to cause the air to flow into the vehicle interior (see, for example, Patent Literature 1).

CITATION LIST

Patent Literature

[Patent Literature 1] Japanese Examined Patent Application Publication No. 63-3219 (third section 26th line to fourth section 16th line, FIG. 1)

SUMMARY OF INVENTION

Technical Problem

In the conventional vehicle air-conditioning apparatus, the fan motor is provided in the air passage where the load-side heat exchanger is located. Therefore, when the load-side heat exchanger is acting as evaporator (i.e., cooler) so as to supply cool air into the vehicle interior, the cool air is heated by the exhaust heat of the motor and as a result the cooling capacity of the vehicle air-conditioning apparatus is degraded. Thus, the vehicle air-conditioning apparatus has a drawback in that sufficiently high energy saving performance is unable to be achieved.

The present invention has been accomplished in view of the foregoing problem, and provides a vehicle air-conditioning apparatus capable of exhibiting improved energy saving performance. The present invention also provides a vehicle in which such a vehicle air-conditioning apparatus is installed.

Solution to Problem

In one embodiment, the present invention provides a vehicle air-conditioning apparatus including a cooler provided in a first air passage, and a first air-sending device including a motor and a fan provided in the first air passage, and configured to drive the fan with the motor to thereby generate an airflow that flows into a vehicle interior through the first air passage. At least a part of an outer surface of the motor is located outside the first air passage.

Advantageous Effects of Invention

In the vehicle air-conditioning apparatus according to one embodiment of the present invention, at least a part of the outer surface of the motor is located outside the first air passage, through which the airflow flowing into the vehicle interior through the cooler passes. Therefore, cool air to be supplied into the vehicle interior is exempted from being heated by the exhaust heat of the motor, and as a result the energy saving performance can be improved.

DESCRIPTION OF EMBODIMENTS

Hereafter, a vehicle air-conditioning apparatus according to Embodiments of the present invention will be described, with reference to the drawings.

Here, the vehicle air-conditioning apparatus according to Embodiments may be applied to a railway vehicle, a motor coach, and various other types of vehicles. In addition, configurations and operations described hereunder are merely exemplary, and the present invention is in no way limited to those configurations and operations. In the drawings, the same or similar elements or portions are given the same numeral, or left unnumbered. Minor details of the configuration may be simplified or omitted, as the case may be. Descriptions of the same or similar configurations may be simplified or omitted, as the case may be.

Embodiment 1

Hereunder, a vehicle air-conditioning apparatus according to Embodiment 1 will be described.
<Configuration and Operation of Vehicle Air-Conditioning Apparatus>

A configuration and an operation of the vehicle air-conditioning apparatus according to Embodiment 1 will be described.

Figure 1:
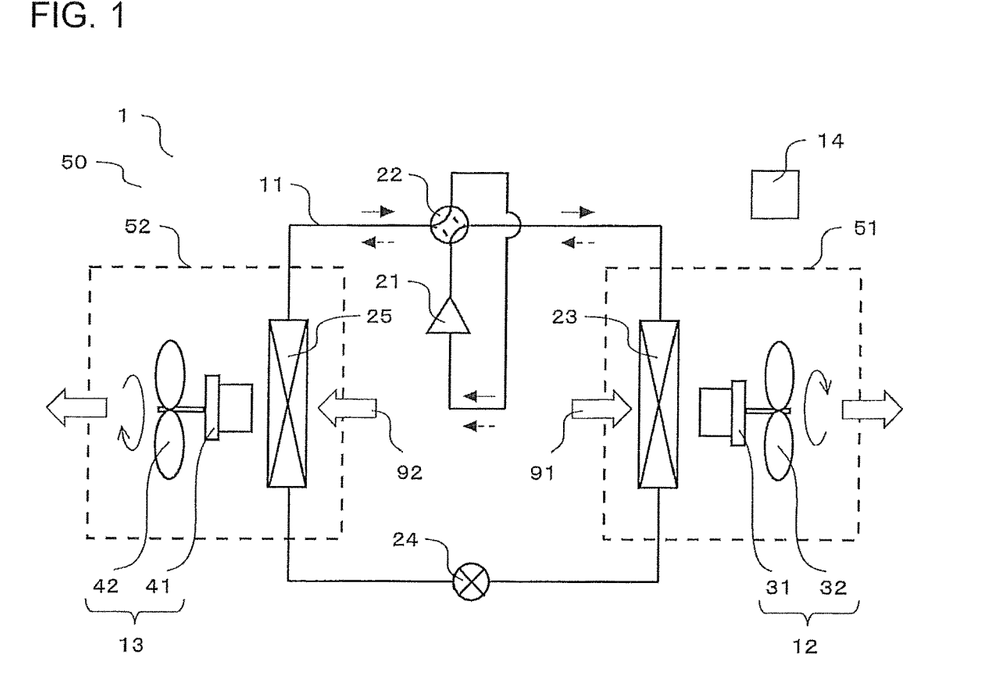
FIG. 1 is a schematic diagram for explaining a configuration and operation of a vehicle air-conditioning apparatus according to Embodiment 1.

FIG. 1 is a schematic diagram for explaining the configuration and operation of the vehicle air-conditioning apparatus according to Embodiment 1. In FIG. 1, flows of refrigerant in a cooling operation are indicated by blackened solid-line arrows, flows of refrigerant in a heating operation are indicated by blackened broken-line arrows, a flow path set in a flow switching device 22 in the cooling operation is indicated by solid lines, and a flow path set in the flow switching device 22 in the heating operation is indicated by broken lines.

As shown in FIG. 1, the vehicle air-conditioning apparatus 1 includes a refrigerant circuit 11, a heat source-side air-sending device 12, a load-side air-sending device 13, and a controller 14. The vehicle air-conditioning apparatus 1 is switchable between the cooling operation and the heating operation. However, the vehicle air-conditioning apparatus 1 may be configured to only perform the cooling operation. The heat source-side air-sending device 12 corresponds to the "second fan" in the present invention. The load-side air-sending device 13 corresponds to the "first fan" in the present invention.

In the refrigerant circuit 11, for example, a compressor 21, the flow switching device 22, a heat source-side heat exchanger 23, an expansion device 24, and a load-side heat exchanger 25 are connected via a pipe. The flow switching device 22 is, for example, a four-way valve, configured to allow the discharge side of the compressor 21 and the heat source-side heat exchanger 23 to communicate with each other in the cooling operation, and allow the discharge side of the compressor 21 and the load-side heat exchanger 25 to communicate with each other in the heating operation. The heat source-side heat exchanger 23 acts as condenser in the cooling operation, and as evaporator in the heating operation. The load-side heat exchanger 25 acts as evaporator (i.e., cooler) in the cooling operation, and as condenser in the heating operation. The load-side heat exchanger 25 corresponds to the "cooler" in the present invention.

The heat source-side air-sending device 12 includes a heat source-side motor 31, and a heat source-side fan 32 connected to the heat source-side motor 31. The heat source-side air-sending device 12 and the heat source-side heat exchanger 23 are provided in a heat source chamber 51 of a vehicle 50. The heat source-side fan 32 generates, upon being driven by the heat source-side motor 31, a heat source-side airflow 91, flowing into the heat source chamber 51 from outside the vehicle and flowing out of the heat source chamber 51 to outside the vehicle. The heat source-side airflow 91 exchanges heat with refrigerant flowing in the heat source-side heat exchanger 23.

The load-side air-sending device 13 includes a load-side motor 41, and a load-side fan 42 connected to the load-side motor 41. The load-side air-sending device 13 and the load-side heat exchanger 25 are provided in a load chamber 52 of the vehicle 50. The load-side fan 42 generates, upon being driven by the load-side motor 41, a load-side airflow 92, flowing into the load chamber 52 from inside the vehicle interior and flowing out of the load chamber 52 into the vehicle interior. The load-side airflow 92 exchanges heat with refrigerant flowing in the load-side heat exchanger 25. The load-side motor 41 corresponds to the "motor" in the present invention. The load-side fan 42 corresponds to the "fan" in the present invention.

The controller 14 serves to control the overall operation of the vehicle air-conditioning apparatus 1. The controller 14 may be constituted, for example, of a microprocessor unit, an updatable program such as firmware, or a program module executed according to instructions from a CPU.

Figure 2:
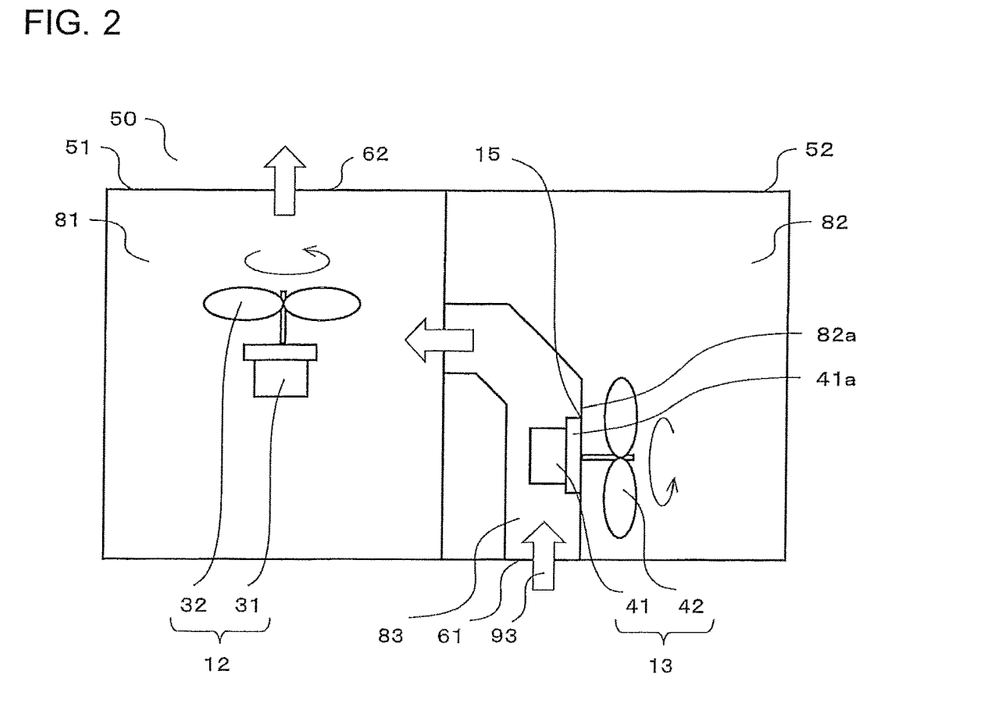
FIG. 2 is a schematic drawing for explaining installation of a load-side air-sending device and discharging of motor exhaust heat, in the vehicle air-conditioning apparatus according to Embodiment 1.

FIG. 2 is a schematic drawing for explaining installation of the load-side air-sending device and discharging of motor exhaust heat, in the vehicle air-conditioning apparatus according to Embodiment 1. FIG. 2 only illustrates essential components.

As shown in FIG. 2, the heat source chamber 51 and the load chamber 52 are located side by side.

A heat source-side air passage 81, having the inlet side and outlet side communicating with outside the vehicle and through which the heat source-side airflow 91 passes, is formed inside the heat source chamber 51. Alternatively, the heat source-side air-sending device 12 and the heat source-side heat exchanger 23 may be respectively located in separate rooms connected via a duct or the like, in which case the inside of the room where the heat source-side air-sending device 12 is located and the inside of the room where the heat source-side heat exchanger 23 is located constitute the heat source-side air passage 81. The heat source-side air passage 81 corresponds to the "third air passage" in the present invention.

A load-side air passage 82, having the inlet side and outlet side communicating with the vehicle interior and through which the load-side airflow 92 passes, is formed inside the load chamber 52. Alternatively, the load-side air-sending device 13 and the load-side heat exchanger 25 may be respectively located in separate rooms connected via a duct or the like, in which case the inside of the room where the load-side air-sending device 13 is located and the inside of the room where the load-side heat exchanger 25 is located constitute the load-side air passage 82. The load-side air passage 82 corresponds to the "first air passage" in the present invention.

A motor exhaust heat air passage 83, having the inlet side communicating with outside the vehicle and the outlet side communicating with the heat source chamber 51, in other words the heat source-side air passage 81, is formed inside the load chamber 52. The heat source-side fan 32 generates, upon being driven by the heat source-side motor 31, a motor exhaust heat airflow 93, flowing into the inlet side of the motor exhaust heat air passage 83 from outside the vehicle, passing through the motor exhaust heat air passage 83, and flowing out to outside the vehicle through the outlet side of the heat source-side air passage 81. The motor exhaust heat air passage 83 corresponds to the "second air passage" in the present invention.

The inlet side of the motor exhaust heat air passage 83 communicates with an opening 61 located on a lower side in the gravity direction, for example the opening 61 formed in the bottom face of the load chamber 52, and the outlet side of the heat source-side air passage 81 communicates with an opening 62 located on an upper side in the gravity direction, for example the opening 62 formed in the upper face of the heat source chamber 51.

The load-side air-sending device 13 includes a flange portion 41a formed around the outer circumferential surface of the load-side motor 41, the flange portion 41a being fixed onto a member serving as partition between the load-side air passage 82 and the motor exhaust heat air passage 83, namely an outer wall 82a of the load-side air passage 82, thus to retain the load-side air-sending device 13. In addition, the load-side air-sending device 13 is retained with the load-side fan 42 located inside the load-side air passage 82, and at least a part of the outer surface of the load-side motor 41 located inside the motor exhaust heat air passage 83. A seal member 15 is provided so as to seal between the flange portion 41a and the outer wall 82a.

<Advantages of Vehicle Air-Conditioning Apparatus>

The advantages of the vehicle air-conditioning apparatus according to Embodiment 1 will be described hereunder.

The vehicle air-conditioning apparatus 1 includes the load-side heat exchanger 25, in other words the cooler, provided in the load-side air passage 82, and the load-side air-sending device 13 including the load-side motor 41 and the load-side fan 42 provided in the load-side air passage 82, and configured to drive the load-side fan 42 with the load-side motor 41 to thereby generate the load-side airflow 92 flowing into the vehicle interior through the load-side air passage 82, and at least a part of the outer surface of the load-side motor 41 is located outside the load-side air passage 82. Therefore, cool air to be supplied into the vehicle interior is exempted from being heated by the exhaust heat of the load-side motor 41, and as a result the energy saving performance of the vehicle air-conditioning apparatus 1 can be improved. Specifically, improvement of cooling capacity by several percent to ten or more percent can be expected, depending on the amount of the exhaust heat of the load-side motor 41.

In addition, in the vehicle air-conditioning apparatus 1 at least a part of the outer surface of the load-side motor 41 is located inside the motor exhaust heat air passage 83 through which the outside air passes. Therefore, the load-side motor 41 can be cooled without the need to additionally provide a cooler or the like, which leads to reduction in cost of the vehicle air-conditioning apparatus 1, as well as to improved energy saving performance of the vehicle air-conditioning apparatus 1.

The vehicle air-conditioning apparatus 1 includes the refrigerant circuit 11, and the heat source-side air-sending device 12 that generates the heat source-side airflow 91 flowing through the heat source-side air passage 81 and flowing out to outside the vehicle. In addition, the inlet side of the motor exhaust heat air passage 83 communicates with outside the vehicle and the outlet side of the motor exhaust heat air passage 83 communicates with the heat source-side air passage 81. Therefore, the load-side motor 41 can be cooled without the need to additionally provide a fan or the like for generating the motor exhaust heat airflow 93, which leads to reduction in cost of the vehicle air-conditioning apparatus 1. Further, the load-side motor 41 can be cooled even when the vehicle 50 is at a stop, which leads to improved reliability of the vehicle air-conditioning apparatus 1.

In the vehicle air-conditioning apparatus 1, the load-side air-sending device 13 is retained on the outer wall 82a of the load-side air passage 82 via the flange portion 41a formed around the outer circumferential surface of the load-side motor 41, and the seal member 15 is provided so as to seal between the flange portion 41a and the outer wall 82a. Such a configuration prevents moisture that has intruded into the motor exhaust heat air passage 83 with the outside air from invading into the load-side air passage 82 through between the flange portion 41a and the outer wall 82a.

In the vehicle air-conditioning apparatus 1, further, the inlet side of the motor exhaust heat air passage 83 communicates with the opening 61 located on the lower side in the gravity direction, and the outlet side of the heat source-side air passage 81 communicates with the opening 62 located on the upper side in the gravity direction. Therefore, the motor exhaust heat airflow 93 flows from the lower side to the upper side in the gravity direction, which leads to improved heat dissipation efficiency of the load-side motor 41.

Embodiment 2

Hereunder, a vehicle air-conditioning apparatus according to Embodiment 2 will be described.

Descriptions of the same aspects as those of the vehicle air-conditioning apparatus of Embodiment 1 may be simplified or omitted, as the case may be.

<Configuration and Operation of Vehicle Air-Conditioning Apparatus>

A configuration and an operation of the vehicle air-conditioning apparatus according to Embodiment 2 will be described.

Figure 3:
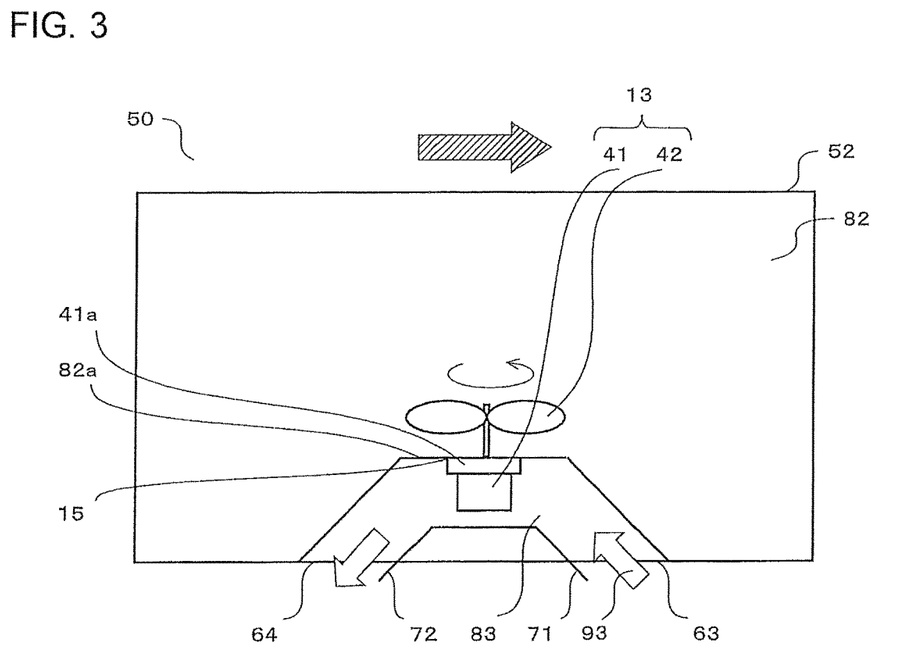
FIG. 3 is a schematic drawing for explaining installation of a load-side air-sending device and discharging of motor exhaust heat, in a vehicle air-conditioning apparatus according to Embodiment 2.

FIG. 3 is a schematic drawing for explaining installation of a load-side air-sending device and discharging of motor exhaust heat, in the vehicle air-conditioning apparatus according to Embodiment 2. FIG. 3 only illustrates essential components. In FIG. 3, the travel direction of the vehicle 50 is indicated by a hatched arrow.

As shown in FIG. 3, the motor exhaust heat air passage 83, having the inlet side and the outlet side communicating with outside the vehicle, is formed inside the load chamber 52. When the vehicle 50 runs in the travel direction, the motor exhaust heat airflow 93, flowing into the inlet side of the motor exhaust heat air passage 83 from outside the vehicle, passing through the motor exhaust heat air passage 83, and flowing out through the outlet side of the motor exhaust heat air passage 83 to outside the vehicle.

The load-side air-sending device 13 includes the flange portion 41a formed around the outer circumferential surface of the load-side motor 41, the flange portion 41a being fixed onto the member serving as partition between the load-side air passage 82 and the motor exhaust heat air passage 83, namely the outer wall 82a of the load-side air passage 82, thus to retain the load-side air-sending device 13. In addition, the load-side air-sending device 13 is retained with the load-side fan 42 located inside the load-side air passage 82, and at least a part of the outer surface of the load-side motor 41 located inside the motor exhaust heat air passage 83. The seal member 15 is provided so as to seal between the flange portion 41a and the outer wall 82a.

The inlet side of the motor exhaust heat air passage 83 communicates with an opening 63 located in a portion of the outer face of the vehicle 50 oriented parallel to the travel direction thereof, for example the opening 63 formed in the side face of the load chamber 52, and the outlet side of the motor exhaust heat air passage 83 communicates with an opening 64 located in a portion of the outer surface of the vehicle 50 oriented parallel to the travel direction thereof, for example the opening 64 formed in the side face of the load chamber 52. The opening 63 corresponds to the "first opening" in the present invention. The opening 64 corresponds to the "third opening" in the present invention.

A guide plate 71 is formed so as to protrude from the vehicle 50, in a rear portion of the peripheral edge of the opening 63 with respect to the travel direction of the vehicle 50. A guide plate 72 is formed so as to protrude from the vehicle 50, in a forward portion of the peripheral edge of the opening 64 with respect to the travel direction of the vehicle 50. The guide plate 71 corresponds to the "first projection" in the present invention. The guide plate 72 corresponds to the "second projection" in the present invention.

<Advantages of Vehicle Air-Conditioning Apparatus>

The advantages of the vehicle air-conditioning apparatus according to Embodiment 2 will be described hereunder.

In the vehicle air-conditioning apparatus 1, the inlet side and the outlet side of the motor exhaust heat air passage 83 communicate with outside the vehicle. Therefore, the load-side motor 41 can be cooled without the need to increase the burden on the heat source-side air-sending device 12, which leads to improved energy saving performance of the vehicle air-conditioning apparatus 1.

In the vehicle air-conditioning apparatus 1, the inlet side of the motor exhaust heat air passage 83 communicates with the opening 63 formed in the portion of the outer face of the vehicle 50 oriented parallel to the travel direction thereof, and the guide plate 71 is formed so as to protrude from the vehicle 50 in the rear portion of the peripheral edge of the opening 63 with respect to the travel direction of the vehicle 50. Therefore, the load-side motor 41 can be cooled utilizing the air stream created by the movement of the vehicle, which leads to improved energy saving performance of the vehicle air-conditioning apparatus 1.

In the vehicle air-conditioning apparatus 1, further, the outlet side of the motor exhaust heat air passage 83 communicates with the opening 64 formed in the portion of the outer face of the vehicle 50 oriented parallel to the travel direction thereof, and the guide plate 72 is formed so as to protrude from the vehicle 50 in the forward portion of the peripheral edge of the opening 64 with respect to the travel direction of the vehicle 50. Therefore, the load-side motor 41 can be cooled even when the vehicle 50 moves backward, which leads to improved reliability of the vehicle air-conditioning apparatus 1.

Embodiment 3

Hereunder, a vehicle air-conditioning apparatus according to Embodiment 3 will be described.

Descriptions of the same aspects as those of the vehicle air-conditioning apparatus of Embodiment 1 and Embodiment 2 may be simplified or omitted, as the case may be.

<Configuration and Operation of Vehicle Air-Conditioning Apparatus>

A configuration and an operation of the vehicle air-conditioning apparatus according to Embodiment 3 will be described.

Figure 4:
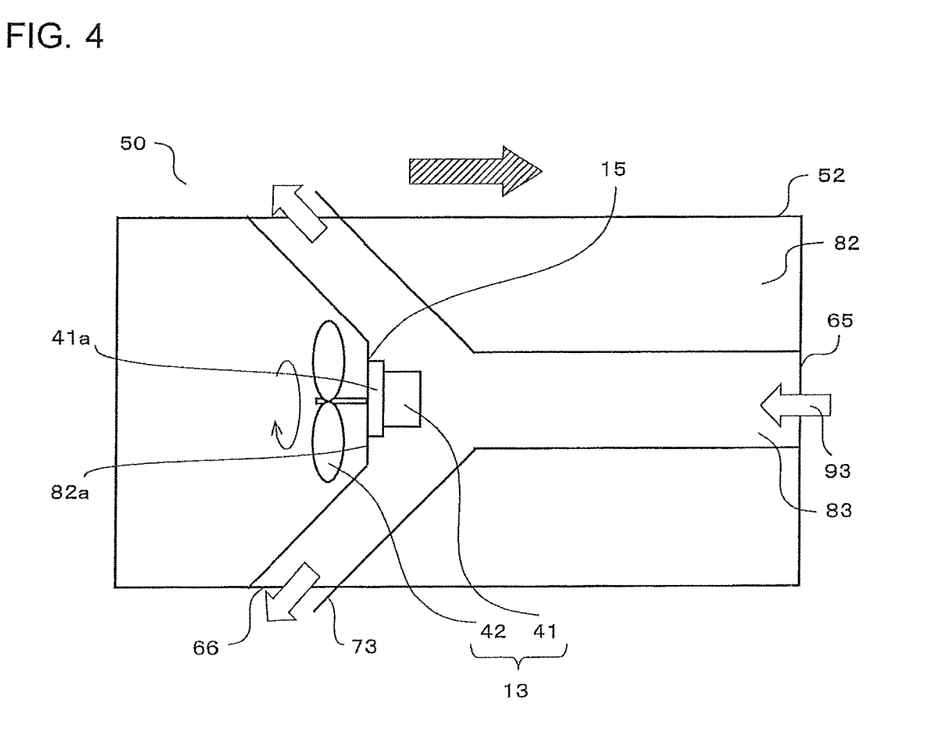
FIG. 4 is a schematic drawing for explaining installation of a load-side air-sending device and discharging of motor exhaust heat, in a vehicle air-conditioning apparatus according to Embodiment 3.

FIG. 4 is a schematic drawing for explaining installation of a load-side air-sending device and discharging of motor exhaust heat, in the vehicle air-conditioning apparatus according to Embodiment 3. FIG. 4 only illustrates essential components. In FIG. 4, the travel direction of the vehicle 50 is indicated by a hatched arrow.

As shown in FIG. 4, the motor exhaust heat air passage 83, having the inlet side and the outlet side communicating with outside the vehicle, is formed inside the load chamber 52. When the vehicle 50 runs in the travel direction, the motor exhaust heat airflow 93, flowing into the inlet side of the motor exhaust heat air passage 83 from outside the vehicle, passing through the motor exhaust heat air passage 83, and flowing out through the outlet side of the motor exhaust heat air passage 83 to outside the vehicle.

The load-side air-sending device 13 includes the flange portion 41a formed around the outer circumferential surface of the load-side motor 41, the flange portion 41a being fixed onto the member serving as partition between the load-side air passage 82 and the motor exhaust heat air passage 83, namely the outer wall 82a of the load-side air passage 82, thus to retain the load-side air-sending device 13. In addition, the load-side air-sending device 13 is retained with the load-side fan 42 located inside the load-side air passage 82, and at least a part of the outer surface of the load-side motor 41 located inside the motor exhaust heat air passage 83. The seal member 15 is provided so as to seal between the flange portion 41a and the outer wall 82a.

The inlet side of the motor exhaust heat air passage 83 communicates with an opening 65 located in a forward portion of the outer face of the vehicle 50 with respect to the travel direction thereof, for example the opening 65 formed in the front face of the load chamber 52, and the outlet side of the motor exhaust heat air passage 83 communicates with an opening 66 located in a portion of the outer surface of the vehicle 50 oriented parallel to the travel direction thereof, for example the opening 66 formed in the side face of the load chamber 52. The opening 65 corresponds to the "second opening" in the present invention. The opening 66 corresponds to the "third opening" in the present invention.

A guide plate 73 is formed so as to protrude from the vehicle 50, in a forward portion of the peripheral edge of the opening 66 with respect to the travel direction of the vehicle 50. The guide plate 73 corresponds to the "second projection" in the present invention.

<Advantages of Vehicle Air-Conditioning Apparatus>

The advantages of the vehicle air-conditioning apparatus according to Embodiment 3 will be described hereunder.

In the vehicle air-conditioning apparatus 1, the inlet side of the motor exhaust heat air passage 83 communicates with the opening 65 formed in the forward portion of the outer face of the vehicle 50 with respect to the travel direction thereof. Therefore, a larger amount of outside air flows into the motor exhaust heat air passage 83 compared with the configuration in which the inlet side of the motor exhaust heat air passage 83 communicates with the opening 63 formed in the portion of the outer surface of the vehicle 50 oriented parallel to the travel direction thereof, which further assures that the load-side motor 41 is effectively cooled, thereby improving the reliability of the vehicle air-conditioning apparatus 1.

In the vehicle air-conditioning apparatus 1, further, the outlet side of the motor exhaust heat air passage 83 communicates with the opening 66 formed in the portion of the outer face of the vehicle 50 oriented parallel to the travel direction thereof, and the guide plate 73 is formed so as to protrude from the vehicle 50 in the forward portion of the peripheral edge of the opening 66 with respect to the travel direction of the vehicle 50. Therefore, the load-side motor 41 can be cooled even when the vehicle 50 moves backward, which leads to improved reliability of the vehicle air-conditioning apparatus 1.

Embodiment 4

Hereunder, a vehicle air-conditioning apparatus according to Embodiment 4 will be described.

Descriptions of the same aspects as those of the vehicle air-conditioning apparatus of Embodiment 1 to Embodiment 3 may be simplified or omitted, as the case may be.

<Configuration and Operation of Vehicle Air-Conditioning Apparatus>

A configuration and an operation of the vehicle air-conditioning apparatus according to Embodiment 4 will be described.

Figure 5:
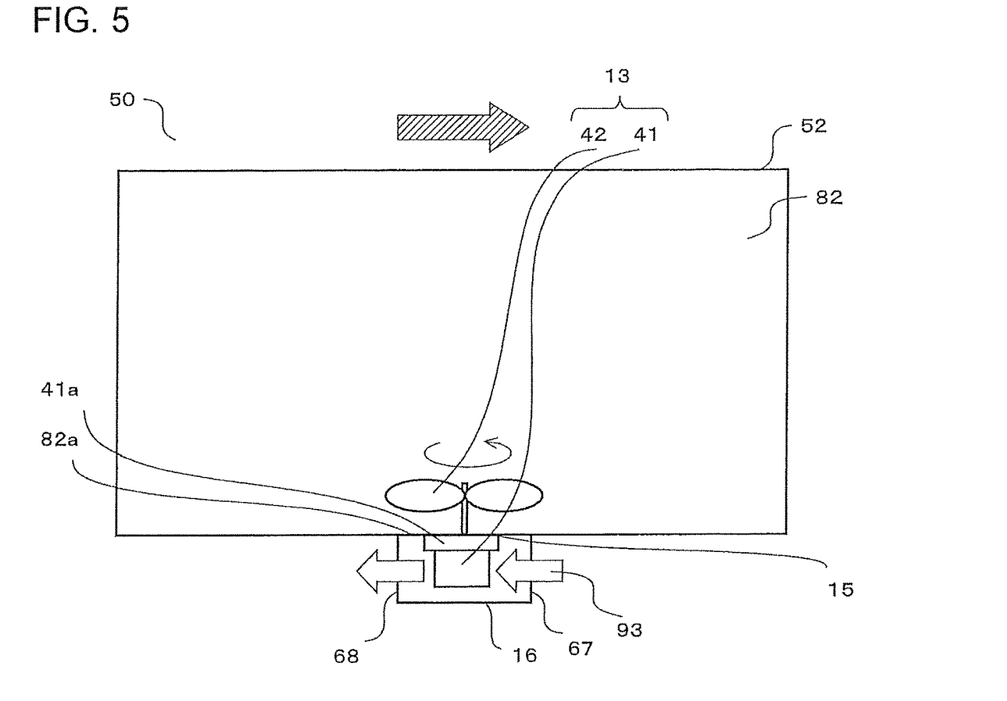
FIG. 5 is a schematic drawing for explaining installation of a load-side air-sending device and discharging of motor exhaust heat, in a vehicle air-conditioning apparatus according to Embodiment 4.

FIG. 5 is a schematic drawing for explaining installation of a load-side air-sending device and discharging of motor exhaust heat, in the vehicle air-conditioning apparatus according to Embodiment 4. FIG. 5 only illustrates essential components. In FIG. 5, the travel direction of the vehicle 50 is indicated by a hatched arrow.

As shown in FIG. 5, the load-side air-sending device 13 is retained on the outer wall of the load chamber 52, in other words the outer wall 82a of the load-side air passage 82, via the flange portion 41a formed around the outer circumferential surface of the load-side motor 41. In addition, the load-side air-sending device 13 is retained with the load-side fan 42 located inside the load chamber 52, and at least a part of the outer surface of the load-side motor 41 protruding from the load chamber 52, in other words from the vehicle 50. When the vehicle 50 runs in the travel direction, the same effect can be obtained as generating the motor exhaust heat airflow 93 from the forward to the rear side in the travel direction of the vehicle 50. The seal member 15 is provided so as to seal between the flange portion 41a and the outer wall 82a.

The load-side motor 41 is covered with a cover member 16 including an opening 67 formed in a forward portion of the outer surface with respect to the travel direction of the vehicle 50 and an opening 68 formed in a rear portion of the outer surface with respect to the travel direction of the vehicle 50. The opening 67 and the opening 68 each correspond to the "fourth opening" in the present invention.

<Advantages of Vehicle Air-Conditioning Apparatus>

The advantages of the vehicle air-conditioning apparatus according to Embodiment 4 will be described hereunder.

In the vehicle air-conditioning apparatus 1, at least a part of the outer surface of the load-side motor 41 protrudes out from the vehicle 50. Therefore, the structure is simplified compared with the case of forming the motor exhaust heat air passage 83 in the load chamber 52, which leads to improved production efficiency of the vehicle air-conditioning apparatus 1. In addition, the load-side motor 41 can be cooled even when the vehicle 50 is at a stop, which leads to improved reliability of the vehicle air-conditioning apparatus 1.

In the vehicle air-conditioning apparatus 1, further, the load-side motor 41 is covered with the cover member 16 including the opening 67 formed in the forward portion of the outer surface with respect to the travel direction of the vehicle 50 and the opening 68 formed in the rear portion of the outer surface with respect to the travel direction of the vehicle 50. In other words, the load-side motor 41 is protected, which leads to improved reliability of the vehicle air-conditioning apparatus 1.

Embodiment 5

Hereunder, a vehicle air-conditioning apparatus according to Embodiment 5 will be described.

Descriptions of the same aspects as those of the vehicle air-conditioning apparatus of Embodiment 1 to Embodiment 4 may be simplified or omitted, as the case may be.

<Configuration and Operation of Vehicle Air-Conditioning Apparatus>

A configuration and an operation of the vehicle air-conditioning apparatus according to Embodiment 5 will be described.

Figure 6:
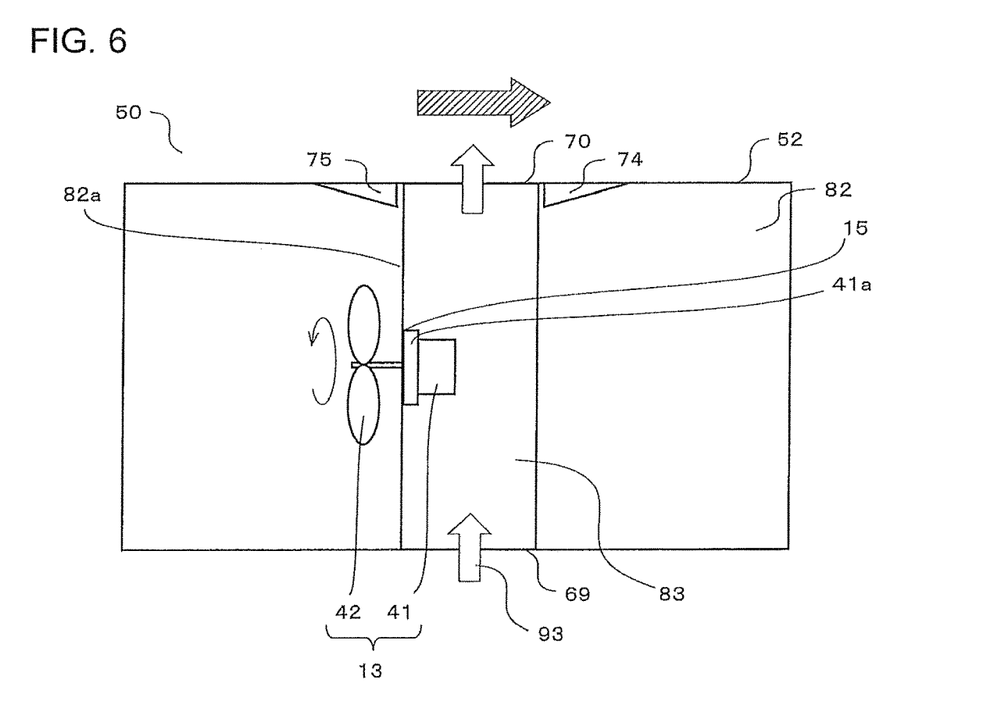
FIG. 6 is a schematic drawing for explaining installation of a load-side air-sending device and discharging of motor exhaust heat, in a vehicle air-conditioning apparatus according to Embodiment 5.

FIG. 6 is a schematic drawing for explaining installation of a load-side air-sending device and discharging of motor exhaust heat, in the vehicle air-conditioning apparatus according to Embodiment 5. FIG. 6 only illustrates essential components. In FIG. 6, the travel direction of the vehicle 50 is indicated by a hatched arrow.

As shown in FIG. 6, the motor exhaust heat air passage 83, having the inlet side and the outlet side communicating with outside the vehicle, is formed inside the load chamber 52. The load-side air-sending device 13 includes the flange portion 41a formed around the outer circumferential surface of the load-side motor 41, the flange portion 41a being fixed onto the member serving as partition between the load-side air passage 82 and the motor exhaust heat air passage 83, namely the outer wall 82a of the load-side air passage 82, thus to retain the load-side air-sending device 13. In addition, the load-side air-sending device 13 is retained with the load-side fan 42 located inside the load-side air passage 82, and at least a part of the outer surface of the load-side motor 41 located inside the motor exhaust heat air passage 83. The seal member 15 is provided so as to seal between the flange portion 41a and the outer wall 82a.

The inlet side of the motor exhaust heat air passage 83 communicates with an opening 69 located in a portion of the outer face of the vehicle 50 oriented parallel to the travel direction thereof, for example the opening 69 formed in the side face of the load chamber 52, and the outlet side of the motor exhaust heat air passage 83 communicates with an opening 70 located in a portion of the outer surface of the vehicle 50 oriented parallel to the travel direction thereof, for example the opening 70 formed in the side face of the load chamber 52. Alternatively, for example, the inlet side of the motor exhaust heat air passage 83 may communicate with the opening 69 formed on the lower face of the load chamber 52, and the outlet side of the motor exhaust heat air passage 83 may communicate with the opening 70 formed on the upper face of the load chamber 52. In such a case, the motor exhaust heat airflow 93 passes from the lower to the upper side in the gravity direction, which leads to improved heat dissipation efficiency of the load-side motor 41. The opening 70 corresponds to the "third opening" in the present invention.

A recess 74 is formed in the outer face of the vehicle 50, on a forward side of the opening 70 with respect to the travel direction of the vehicle 50. Likewise, a recess 75 is formed in the outer face of the vehicle 50, on a rear side of the opening 70 with respect to the travel direction of the vehicle 50. The recess 74 and the recess 75 may be connected to each other.

When the vehicle 50 runs at a high speed in the travel direction, the air stream created by the movement of the vehicle is led by the recess 74 on the forward side of the opening 70 with respect to the travel direction of the vehicle 50, so that the air stream passing along the lateral side of the opening 70 is separated. Accordingly, static pressure on the outlet side of the motor exhaust heat air passage 83 is reduced, and hence the motor exhaust heat airflow 93, flowing into the inlet side of the motor exhaust heat air passage 83 from outside the vehicle, passing through the motor exhaust heat air passage 83, and flowing out through the outlet side of the motor exhaust heat air passage 83 to outside the vehicle, is generated. When the vehicle 50 moves backward also, the air stream is led by the recess 75 so that the air stream passing along the lateral side of the opening 70 is separated, and as a result the motor exhaust heat airflow 93 is generated.

<Advantages of Vehicle Air-Conditioning Apparatus>

The advantages of the vehicle air-conditioning apparatus according to Embodiment 5 will be described hereunder.

In the vehicle air-conditioning apparatus 1, the recess 74 is formed in the outer face of the vehicle 50, on the forward side of the opening 70 with respect to the travel direction of the vehicle 50. Therefore, the load-side motor 41 can be cooled without the need to increase the burden on the heat source-side air-sending device 12, which leads to improved energy saving performance of the vehicle air-conditioning apparatus 1.

In the vehicle air-conditioning apparatus 1, further, the recesses 74 and 75 are formed in the outer face of the vehicle 50, on the forward and rear sides of the opening 70 with respect to the travel direction of the vehicle 50. Therefore, the load-side motor 41 can be cooled even when the vehicle 50 moves backward, which leads to improved reliability of the vehicle air-conditioning apparatus 1.

Although Embodiment 1 to Embodiment 5 have been described as above, the present invention is not limited to those Embodiments. For example, a part or the whole of any of Embodiments may be added to each of Embodiment 1 to Embodiment 5, or a part of any of Embodiments may be substituted with a part of another Embodiment.

In Embodiment 3, for example, when the vehicle 50 is not designed to move backward, or a type that seldom moves backward, such as a motor coach, the guide plate 73 may be excluded, and instead the recess 74 may be formed in the outer face of the vehicle 50 on the forward side of the opening 66 with respect to the travel direction of the vehicle 50. Such a configuration facilitates the outside air to flow into the motor exhaust heat air passage 83, which leads to improved heat dissipation efficiency of the load-side motor 41.

REFERENCE SIGNS LIST

1: vehicle air-conditioning apparatus, 11: refrigerant circuit, 12: heat source-side air-sending device, 13: load-side air-sending device, 14: controller, 15: seal member, 16: cover member, 21: compressor, 22: flow switching device, 23: heat source-side heat exchanger, 24: expansion device, 25: load-side heat exchanger, 31: heat source-side motor, 32: heat source-side fan, 41: load-side motor, 41a: flange portion, 42: load-side fan, 50: vehicle, 51: heat source chamber, 52: load chamber, 61 to 70: opening, 71 to 73: guide plate, 74, 75: recess, 81: heat source-side air passage, 82: load-side air passage, 82a: outer wall, 83: motor exhaust heat air passage, 91: heat source-side airflow, 92: load-side airflow, 93: motor exhaust heat airflow

The invention claimed is:

1. A vehicle air-conditioning apparatus comprising:
a first air passage provided with a cooler;
a second air passage through which outside air passes, the second air passage having no fluid communication with the first air passage; and
a first air-sending device including a motor and a single fan, wherein the single fan is provided in the first air passage, and the motor is configured to drive the fan to thereby generate an airflow flowing into a vehicle interior through the first air passage,
wherein an outer surface of the motor is located inside the second air passage, and no fan is located inside the second air passage.

2. The vehicle air-conditioning apparatus of claim 1, further comprising:
a refrigerant circuit in which a compressor, a heat source-side heat exchanger provided in a third air passage, an expansion device, and a load-side heat exchanger serving as the cooler are connected via a pipe; and
a second air-sending device configured to generate an airflow passing through the third air passage and flowing out of a vehicle,
wherein an inlet side of the second air passage communicates with outside the vehicle, and
an outlet side of the second air passage communicates with the third air passage.

3. The vehicle air-conditioning apparatus of claim 1, wherein an inlet side and an outlet side of the second air passage communicate with outside a vehicle.

4. The vehicle air-conditioning apparatus of claim 3, wherein the inlet side of the second air passage communicates with a first opening formed in a portion of an outer face of the vehicle oriented parallel to a travel direction of the vehicle, and
a first projection is formed on a rear side of a peripheral edge of the first opening, with respect to the travel direction of the vehicle.

5. The vehicle air-conditioning apparatus of claim 3, wherein the inlet side of the second air passage communicates with a second opening formed in a forward portion of an outer face of the vehicle, with respect to a travel direction of the vehicle.

6. The vehicle air-conditioning apparatus of claim 4, wherein the outlet side of the second air passage communicates with an outlet opening formed in a portion of the outer face of the vehicle oriented parallel to the travel direction of the vehicle, and
a second projection is formed on a forward side of the peripheral edge of the outlet opening, with respect to the travel direction of the vehicle.

7. The vehicle air-conditioning apparatus of claim 3, wherein the outlet side of the second air passage communicates with a third opening formed in a portion of the outer face of the vehicle oriented parallel to a travel direction of the vehicle, and
a recess is formed in the outer face of the vehicle on a forward side of the third opening, with respect to the travel direction of the vehicle.

8. The vehicle air-conditioning apparatus of claim 3, wherein the outlet side of the second air passage communicates with a third opening formed in a portion of an outer face of the vehicle oriented parallel to a travel direction of the vehicle, and
recesses are formed in the outer face of the vehicle on a forward side and a rear side of the third opening respectively, with respect to the travel direction of the vehicle.

9. The vehicle air-conditioning apparatus of claim 1, wherein at least a part of an outer surface of the motor protrudes from a vehicle.

10. The vehicle air-conditioning apparatus of claim 9, wherein the at least the part of the outer surface of the motor is covered with a cover member, and
the cover member includes fourth openings respectively formed in a forward portion and a rear portion of an outer surface of the cover member, with respect to a travel direction of the vehicle.

11. The vehicle air-conditioning apparatus of claim 1, wherein the first air-sending device is retained by fixing a flange portion formed around an outer circumferential surface of the motor onto an outer wall of the first air passage, and
a seal member is provided so as to seal between the flange portion and the outer wall.

12. A vehicle comprising the vehicle air-conditioning apparatus of claim 1.

13. The vehicle air-conditioning apparatus according to claim 1, wherein
an inlet side of the second air passage communicates with a first opening formed in a portion of an outer face of the vehicle oriented parallel to a travel direction of the vehicle,
a first projection is formed on a rear side of a peripheral edge of the first opening, with respect to the travel direction of the vehicle,
an outlet side of the second air passage communicates with an outlet opening formed in a portion of the outer face of the vehicle oriented parallel to the travel direction of the vehicle, and
a second projection is formed on a side close to the first opening of the peripheral edge of the outlet opening.

* * * * *